(12) United States Patent
Murakami

(10) Patent No.: US 7,132,810 B2
(45) Date of Patent: Nov. 7, 2006

(54) POWER SUPPLYING APPARATUS AND POWER SUPPLYING METHOD

(75) Inventor: Jun-ichi Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/168,436

(22) Filed: Jun. 29, 2005

(65) Prior Publication Data

US 2006/0214613 A1 Sep. 28, 2006

(30) Foreign Application Priority Data

Mar. 28, 2005 (JP) ............... 2005-092377

(51) Int. Cl.
*H02P 3/14* (2006.01)
(52) U.S. Cl. .................. 318/376; 318/440; 318/800; 318/872
(58) Field of Classification Search ............... 307/10.1; 323/284; 318/376, 440, 800, 872; 388/800
See application file for complete search history.

(56) References Cited

U.S. PATENT DOCUMENTS

| 5,604,426 A | 2/1997 | Okamura et al. |
| 2004/0245952 A1* | 12/2004 | Yamada et al. ............. 318/377 |
| 2005/0007089 A1* | 1/2005 | Niiyama et al. ............. 323/284 |
| 2005/0093370 A1* | 5/2005 | Amano et al. ............. 307/10.1 |

FOREIGN PATENT DOCUMENTS

JP 7-99740 4/1995

\* cited by examiner

*Primary Examiner*—Karen Masih
(74) *Attorney, Agent, or Firm*—Staas & Halsey LLP

(57) ABSTRACT

An apparatus for supplying a power to a motor for driving a mechanism that conveys a cartridge of a storage medium includes an accumulating unit that accumulates a regenerative power generated by the motor in a capacitor; and an adjusting unit that adjusts, when the power is supplied to the motor, a ratio of power supply from a power source to power supply from the capacitor.

8 Claims, 6 Drawing Sheets

POWER SUPPLYING APPARATUS AND POWER SUPPLYING METHOD

BACKGROUND OF THE INVENTION

1. Field of the Invention

The present invention relates to a power supplying apparatus and power supplying method for supplying power to a motor that drives a mechanism, such as a disk auto-changer in a library apparatus.

2. Description of the Related Art

Library apparatuses including a mechanism that conveys storage medium cartridges have been commonly used. I the library apparatus, the storage medium cartridges, such as electromagnetic tapes, electromagnetic disks, optical disks and magneto-optical disks, are stored in a rack. The mechanism conveys the storage medium cartridges between the rack and a drive device that performs reading/writing of data in the storage medium.

When a position to store a cartridge in the rack is designated, the mechanism moves according to a predetermined movement pattern, and an electric current is supplied to a motor that drives the mechanism according to the movement pattern.

FIG. 4 is a schematic for illustrating a relation between movement of the mechanism and the electric current flowing into the motor. When the mechanism conveys a cartridge from the rack to the drive device, or from the drive device to the rack, a state of the mechanism transitionally changes from a stop state, an accelerating state, a constant-speed state, a decelerating state, and back to the stop state.

In the accelerating state, the motor requires a stable supply of electric current to accelerate movement of the mechanism at a fixed rate.

In the decelerating state, if the motor is operated as a power unit, mechanical energy is converted into electric energy. Thus, theoretically, the same amount of electric current as an amount of the electric current input to the motor is generated as a regenerative current. However, practically, the amount of the regenerative current is not the same as the amount of the electric current input to the motor due to an energy conversion loss.

In conventional library apparatuses, the regenerative current is converted into heat to be disposed. FIG. 5 is a block diagram of a conventional power supply system, and FIG. 6 is a block diagram of a conventional power supply system that includes an uninterruptible power supply (UPS).

The power supply system shown in FIG. 5 includes an alternating-current (AC) power source 1 and a library apparatus 2. The AC power source 1 supplies power to the library apparatus 2 at a voltage of 100 volts (V) to 220 V. The library apparatus 2 has the same configuration as described above.

The library apparatus 2 includes a power source 3, a driving-power amplification circuit 4, a commutator 5, a control circuit 6, a motor 7, and a resistance 8.

The power source 3 receives power from the AC power source 1, and supplies the power to the driving-power amplification circuit 4. The driving-power amplification circuit 4 amplifies the power supplied from the power source 3.

The commutator 5 changes a direction of the current to change a direction of rotation of the motor 7. The control circuit 6 controls the commutator 5 to make the direction of the current change.

The motor 7 drives a mechanism (not shown) in the library apparatus 2. A regenerative current is generated in the motor 7 while the mechanism is moving in the decelerating state. The resistance 8 converts the regenerative current into heat to be disposed.

The system shown in FIG. 6 further includes a UPS 9. The UPS 9 is an uninterruptible power supply unit including a lead accumulator that accumulates power. Therefore, even when there is a momentary power failure in the AC power source 1, the power accumulated in the lead accumulator is supplied to the library apparatus 2, so that the library apparatus 2 does not stop operating.

However, in these power supply systems, the regenerative current generated in the motor 7 is wasted to be disposed as heat without being used. Moreover, cost of the power supply system increases if the UPS 9 is provided to counter momentary power failures.

A technology for using the regenerative current and countering momentary power failures is disclosed in, for example, Japanese Patent Application Laid Open No. H7-99740. In the technology, a power unit includes a first capacitor with large capacitance and high anode resistance, a second capacitor with relatively small capacitance and low anode resistance, and a direct current (DC)-DC converter that connects the first capacitor and the second capacitor.

In this power unit, when power is supplied to the first capacitor from an external power unit, the power is supplied to the second capacitor through the DC—DC converter, and then to a load connected to the second capacitor.

Furthermore, when regenerative power generated in the load is supplied to the second capacitor, the DC—DC converter supplies the power to the first capacitor. When the voltage of the second capacitor decreases due to power consumption by the load, the DC—DC converter supplies the power to the second capacitor, and the power is supplied to the load.

However, when the mechanism continuously repeats conveyance of storage medium cartridges for many times, a speed at which the motor consumes power exceeds a speed at which power is accumulated in the first capacitor from the external power unit. Thus, the first capacitor cannot supply enough power to the second capacitor before the power runs out.

Theoretically, the same amount of power consumed by the motor can be obtained by using the regenerative power, however, the same amount of power cannot be obtained by the regenerative power due to the energy conversion loss. As a result, the motor requires power from the external power unit.

Therefore, it is imperative to develop a power supply system that uses regenerative power to reduce power consumption and that supplies a stable amount of power even when power consumption is large.

SUMMARY OF THE INVENTION

It is an object of the present invention to at least solve the problems in the conventional technology.

An apparatus according to one aspect of the present invention, which is for supplying a power to a motor for driving a mechanism that conveys a cartridge of a storage medium, includes an accumulating unit that accumulates a regenerative power generated by the motor in a capacitor; and an adjusting unit that adjusts, when the power is supplied to the motor, a ratio of power supply from a power source to power supply from the capacitor.

A method according to anther aspect of the present invention, which is for supplying a power to a motor for driving a mechanism that conveys a cartridge of a storage medium, includes accumulating a regenerative power generated by the motor in a capacitor; and adjusting, when the power is supplied to the motor, a ratio of power supply from a power source to power supply from the capacitor.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to accompanying drawings.

Figure 1:
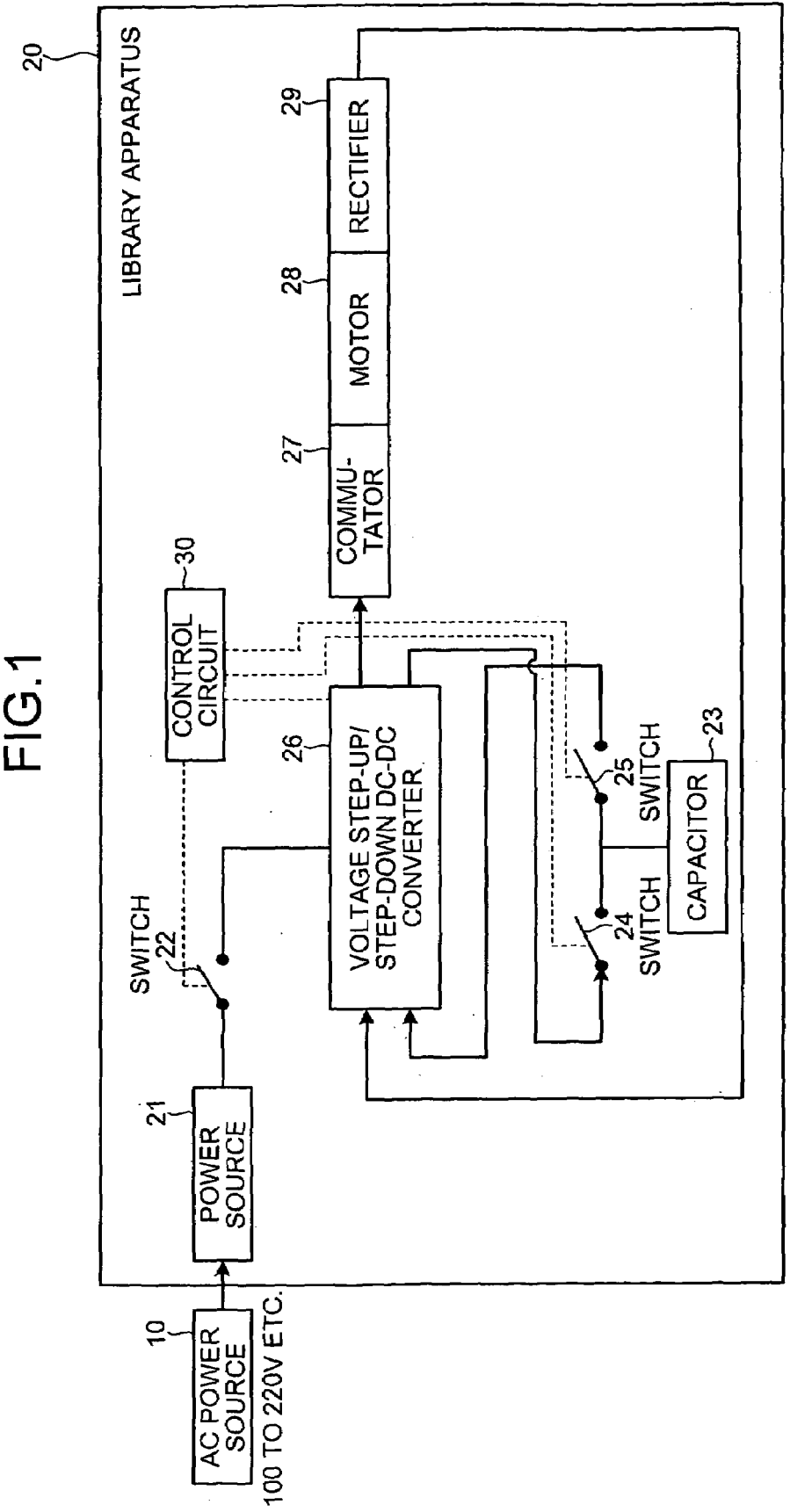
FIG. 1 is a block diagram of a power supply system of an embodiment according to the present invention.

FIG. 1 is a block diagram of a power supply system according to an embodiment according of the present invention. The power supply system includes an AC power source 10 and a library apparatus 20. The AC power source 10 is the same as the AC power source 1 shown in FIG. 5.

In the library apparatus 20, cartridges of a storage medium are stored in a rack (not shown), and a mechanism (not shown) conveys the cartridges between the rack and a drive device (not shown). The drive device performs reading/writing of data in the storage medium.

In the library apparatus 20, regenerative power generated during movement of the mechanism in which the mechanism moves while decelerating a speed into a capacitor 23. Then, the library apparatus 20 adjusts a ratio of power supply from the AC power source 10 to power supply from the capacitor 23, and supplies power to a motor 28 that drives the mechanism.

Accordingly, the regenerative power is used so that power consumption is reduced. Moreover, a stable amount of power is supplied to the motor 28 by using both the AC power source 10 and the capacitor 23, even when power consumption of the motor 28 is large.

The library apparatus 20 includes a power source 21, a switch 22, the capacitor 23, a switch 24, a switch 25, a voltage step-up/step-down DC—DC converter 26 of a current-output-type, a commutator 27, the motor 28, a rectifier 29, and a control circuit 30.

Figure 5:
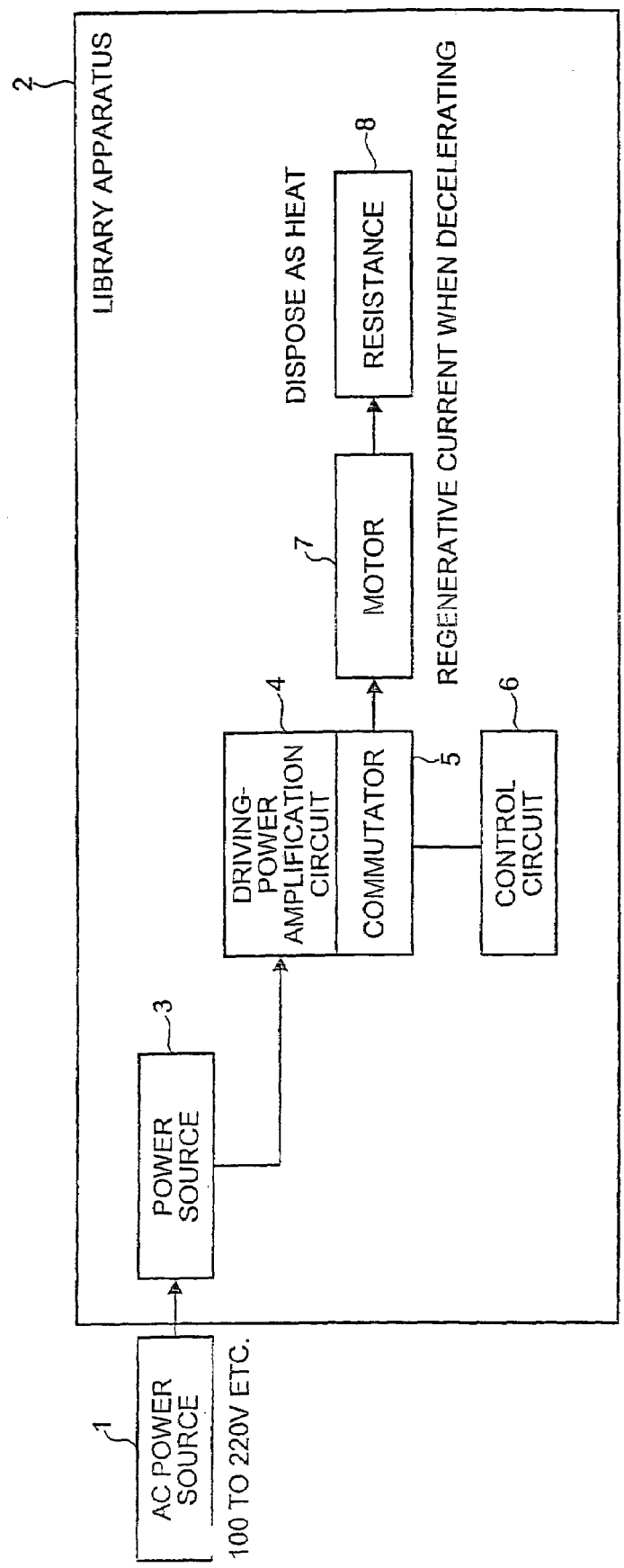
FIG. 5 is a block diagram of a conventional power supply system.
Figure 6:
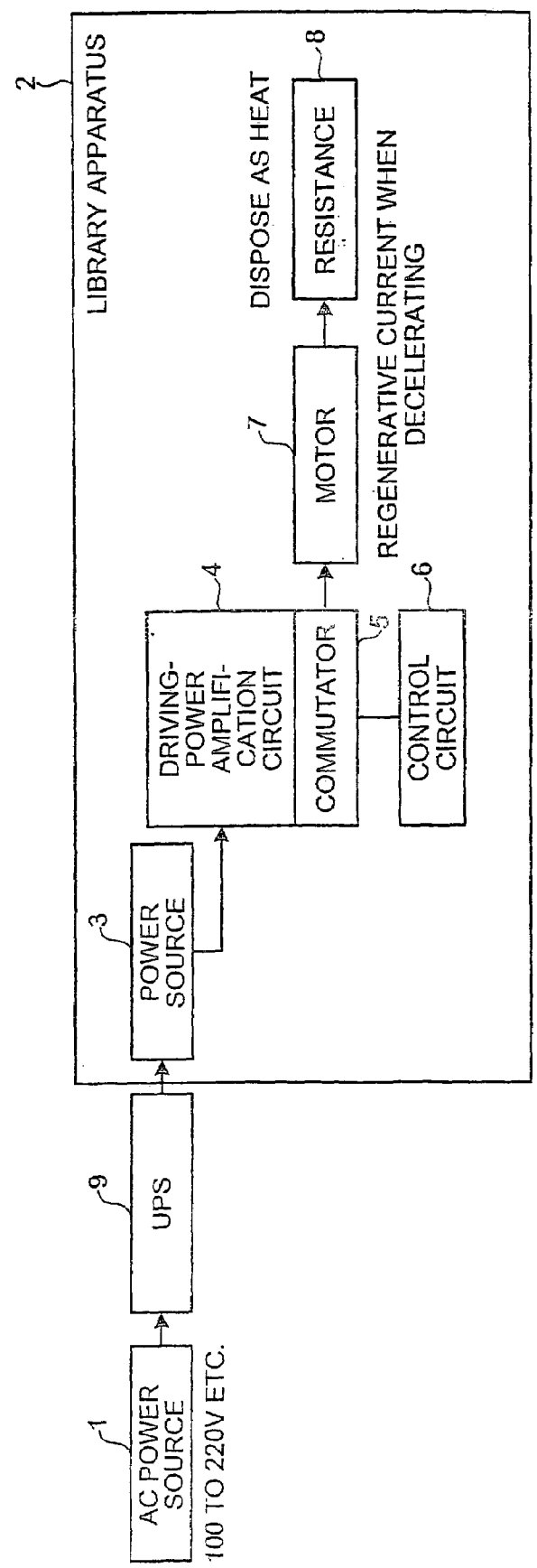
FIG. 6 is a block diagram of a conventional power supply system that includes a UPS.

The power source 21 is the same as the power source 3 shown in FIG. 5. The switch 22 is used to switch supply of power from the power source 21 to the voltage step-up/step-down DC—DC converter 26 between supplying and not supplying. The control circuit 30 controls switching on/off of the switch 22.

The capacitor 23 receives the regenerative power from the rectifier 29 through the motor 28. The power is accumulated in an electric double-layer capacitor built in the capacitor 23.

By using the electric double-layer capacitor, the regenerative power can be accumulated without increasing the cost of the library apparatus 20 as a case of using the lead accumulator. Moreover, power can be repeatedly accumulated and discharged without deteriorating accumulation efficiency. Furthermore, because the library apparatus 20 does not use lead or sulfuric acid as electrolyte, the library apparatus 20 is environment-friendly, and is light in weight.

The switch 24 is switched on to accumulate the regenerative power into the capacitor 23. The switch 25 is switched on when the regenerative power accumulated in the capacitor 23 is supplied to the motor 28. The control circuit 30 controls switching on/off of the switch 24 and the switch 25.

The voltage step-up/step-down DC—DC converter 26 both steps up and steps down the voltage. The voltage step-up/step-down DC—DC converter 26 supplies power to the motor 28 through the commutator 27. Moreover, the voltage step-up/step-down DC—DC converter 26 receives regenerative power generated in the motor 28 through the rectifier 29, and accumulates the regenerative power in the capacitor 23.

When supplying the power accumulated in the capacitor 23 to the motor 28, output voltage of the capacitor 23 gradually decreases. However, a stable current needs to be supplied to the motor 28 for the mechanism to accelerate a movement speed of the mechanism at a fixed rate. Accordingly, the motor 28 requires a higher voltage as the number of revolutions of the motor 28 increases.

When accumulating the regenerative power in the capacitor 23, a regenerative voltage of the motor 28 decreases as the number of revolutions of the motor 28 decreases. However, a stable current needs to be supplied to the motor 28 to efficiently accumulate power in the capacitor 23.

Thus, when the regenerative power is accumulated in the capacitor 23 at a fixed current, it is necessary to make the regenerative voltage increase with time instead of decreasing with time.

Therefore, according to the present embodiment, the voltage step-up/step-down DC—DC converter 26 is used to supply power to the motor 28, and to accumulate the regenerative power generated in the motor 28 in the capacitor 23.

The control circuit 30 controls the voltage step-up/step-down DC—DC converter 26 to adjust a ratio of power supply from the power source 21 to power supply from the capacitor 23, to supply power to the motor 28.

Specifically, the control circuit 30 reads a movement pattern of the mechanism that is stored in a memory (not shown) beforehand. Then, according to a state of the mechanism, the control circuit 30 controls the voltage step-up/step-down DC—DC converter 26 to acquire a required amount of power from the power source 21 and the capacitor 23 in an optimal proportion, and supply the power to the motor 28.

For example, when the mechanism is moving while accelerating a speed of movement, the motor 28 consumes a large amount of power. Therefore, the voltage step-up/step-down DC—DC converter 26 supplies the power from the power source 21 to the motor 28 at a higher ratio than the power form the capacitor 23.

When the mechanism is moving at a constant speed, the motor 28 does not consume much power. Therefore, the voltage step-up/step-down DC—DC converter 26 supplies a the power from the capacitor 23 at a higher ratio than the power form the power source 21.

While the mechanism is stopped, the voltage step-up/step-down DC—DC converter 26 supplies a current from the power source 21 to the capacitor 23, just to compensate for decrease in accumulated power due to natural discharge.

Figure 2:
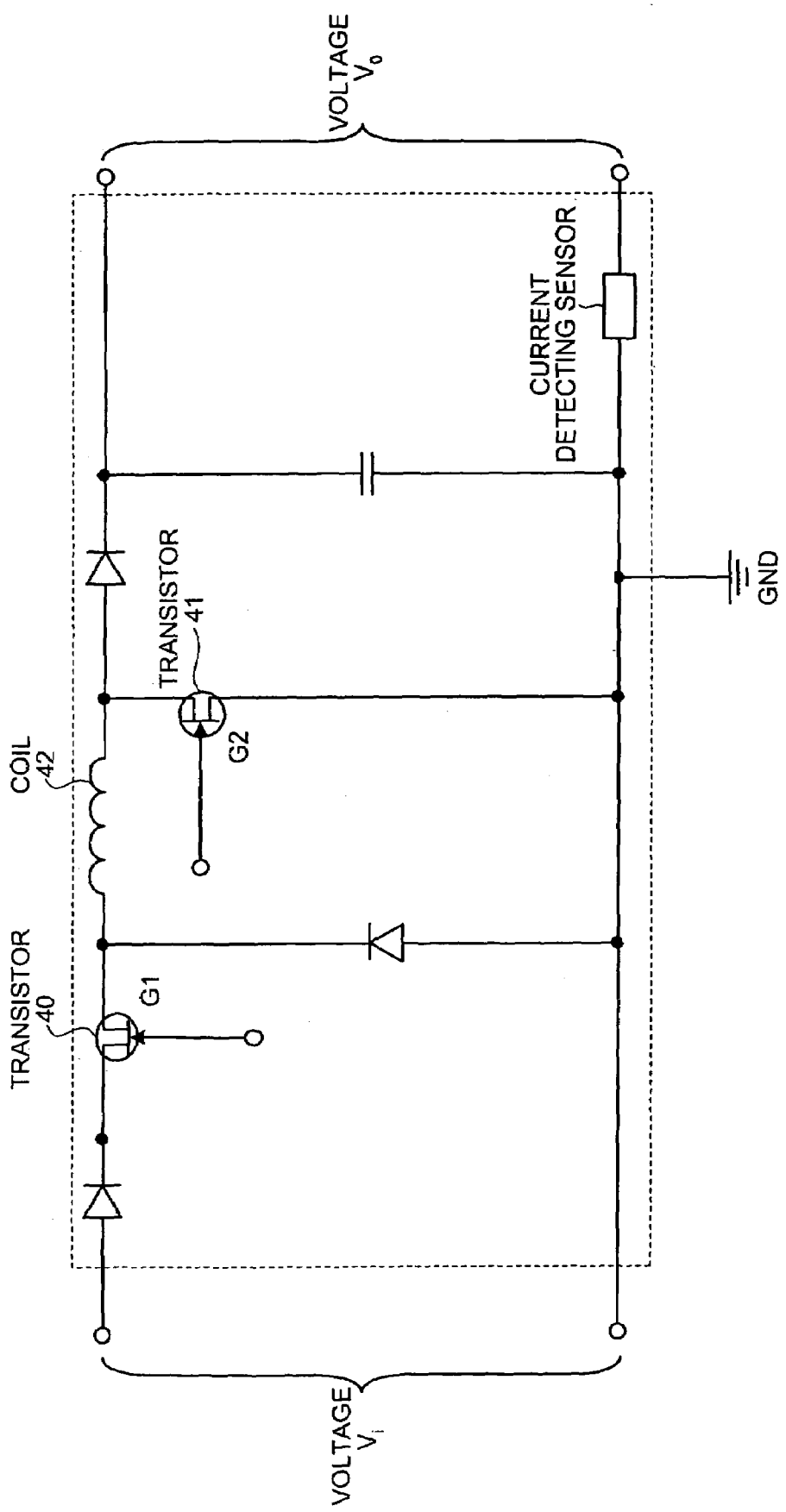
FIG. 2 is a circuit diagram of a voltage step-up/step-down DC—DC converter of current-output-type shown in FIG. 1.

FIG. 2 is a circuit diagram of the voltage step-up/step-down DC—DC converter 26 shown in FIG. 1.

When a gate G1 of a transistor 40 and a gate G2 of a transistor 41 are switched on simultaneously, a current flows to a ground GND through the transistor 41.

However, if the gates G1 and G2 are switched on within a sufficiently short time compared to a time constant when magnetic energy is accumulated in a coil 42, the amount of current loss flowing to the GND is negligible.

Taking advantage of this phenomenon, when stepping up the voltage (voltage Vi<voltage Vo), the gates G1 and G2 are both switched on within a short time and then switched off simultaneously. Thus, magnetic energy accumulated in the coil 42 is discharged as counter-electromotive voltage, so that the circuit functions as a step-up circuit.

On the other hand, when stepping down the voltage (voltage Vi>voltage Vo), the gate G2 is always switched off, and the gate G1 is switched on. Thus, pulse-width modulation (PWM) control is performed for the power supply.

The control circuit 30 shown in FIG. 1 controls the switching on/off of the gates G1 and G2.

The voltage step-up/step-down DC—DC converter 26 functions as a circuit that supplies power to the motor 28, accumulates power in the capacitor 23, and steps up/down the voltage. Therefore, the cost of the library apparatus 20 is reduced.

Figure 3:
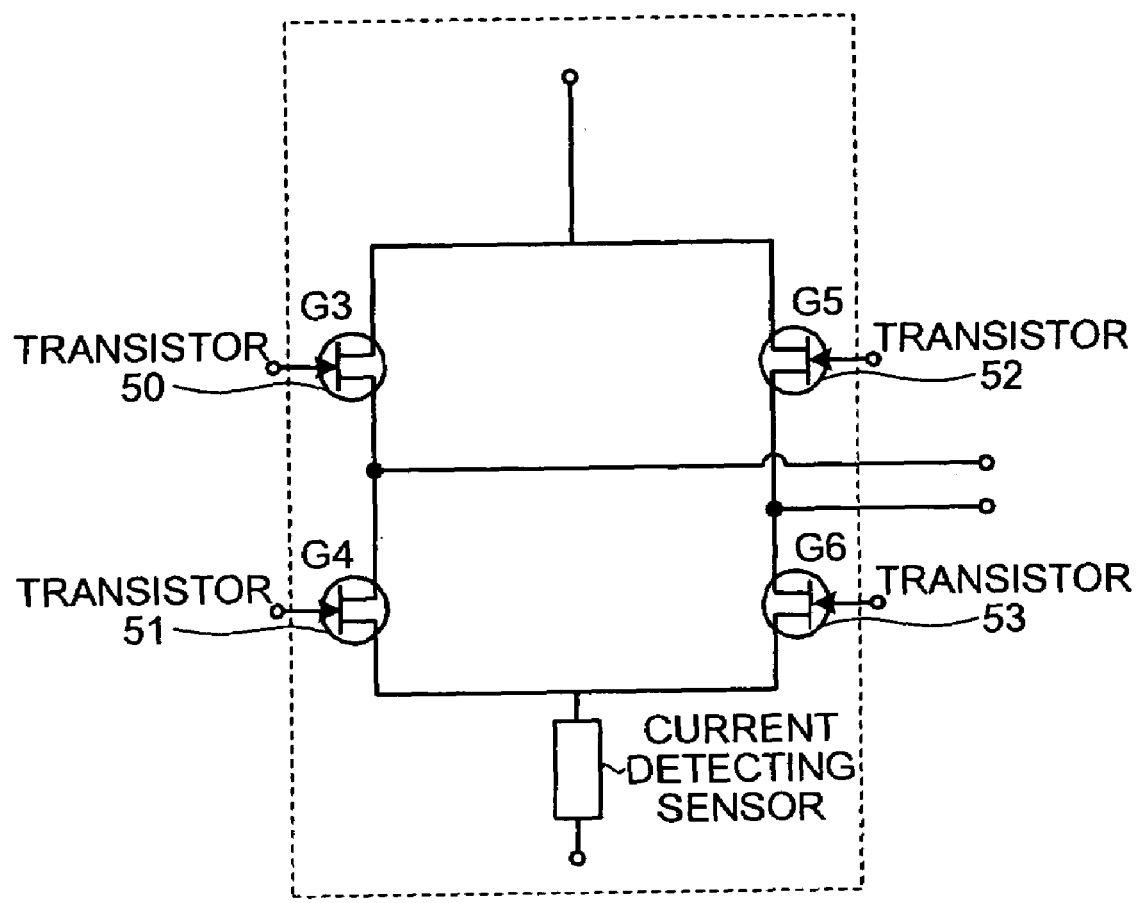
FIG. 3 is a schematic of a commutator shown in FIG. 1.
Figure 4:
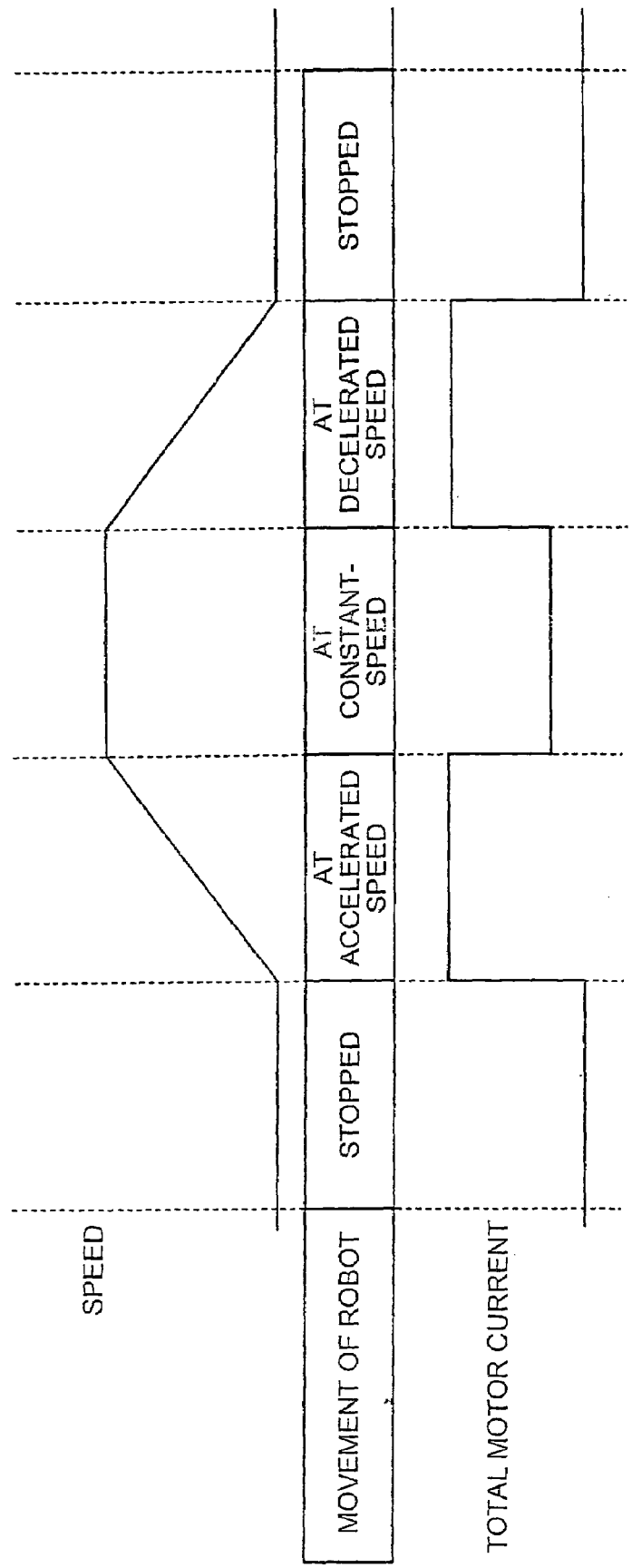
FIG. 4 is a schematic for illustrating a relation between movement of the mechanism and the electric current flowing into the motor.

Referring back to FIG. 1, the commutator 27 changes the direction of the current to change the direction of rotation of the motor 28. FIG. 3 is a schematic of the commutator 27 shown in FIG. 1.

The commutator 27 employs an H-bridge arrangement including four transistor switches. Transistors 50 to 53 switch on/off gates G3 to G6, respectively, so as to change the direction of the rotation of the motor 28. Moreover, this circuit amplifies the power that drives the motor 28. The control circuit 30 controls the switching on/off of the gates G3 to G4.

The motor 28 drives the mechanism of the library apparatus 20. The rectifier 29 rectifies a regenerative current generated in the motor 28.

The control circuit 30 controls the switching on/off of the switches 22, 24, and 25, the gates G1, G2 of the transistors 40, 41 in the voltage step-up/step-down DC—DC converter 26, and the gates G3 to G6 of the transistors 50 to 53 in the commutator 27.

Furthermore, based on the movement pattern of the mechanism stored in the memory, the control circuit 30 controls the voltage step-up/step-down DC—DC converter 26 to adjust the ratio of the power supply from the power source 21 to the power supply from the capacitor 23, and supplies the power to the motor 28 through the commutator 27.

According to the present embodiment, the control circuit 30 controls the voltage step-up/step-down DC—DC converter 26 to accumulate the regenerative power generated in the motor 28 in the capacitor 23. Moreover, when supplying power to the motor 28, the control circuit 30 controls the voltage step-up/step-down DC—DC converter 26 to adjust the ratio of the power supply from the power source 21 to the power supply from the capacitor 23. Therefore, the regenerative power is used so that power consumption is reduced, and a stable amount of power is supplied even when power consumption is large.

Furthermore, according to the present embodiment, the voltage step-up/step-down DC—DC converter 26 is used to accumulate and supply power. Therefore, a stable current is output, so that the motor 28 accelerates the mechanism at a fixed rate, and a structure in which the regenerative power is accumulated efficiently can be realized at low cost.

Moreover, according to the present embodiment, the control circuit 30 controls the voltage step-up/step-down DC—DC converter 26 to adjust the amount of power supply based on an anticipated movement pattern of the mechanism. Therefore, when a movement pattern of the mechanism is predictable, the ratio of the power supply from the power source 21 to the power supply from the capacitor 23 is adjusted to an optimal ratio according to the state of the mechanism.

Furthermore, according to the present embodiment, the regenerative power is accumulated in the electric double-layer capacitor. Therefore, the cost of the library apparatus 20 does not increase as the case of using the lead accumulator. Moreover, power can be repeatedly accumulated and discharged without deteriorating accumulation efficiency. Furthermore, because the library apparatus 20 does not use lead or sulfuric acid as electrolyte, the library apparatus 20 is environment-friendly, and is light in weight.

The present invention is not limited to the present embodiments described above. Various modifications may be made without departing from the scope of the present invention.

All the automatic processes explained in the present embodiment can be, entirely or in part, carried out manually. Similarly, all the manual processes explained in the present embodiment can be entirely or in part carried out automatically by a known method.

The sequence of processes, the sequence of controls, and specific names in the descriptions or figures can be changed as required unless otherwise specified.

The constituent elements of the library apparatus 20 illustrated are merely conceptual and may not necessarily physically resemble the structures shown in the drawings.

For example, the library apparatus 20 need not necessarily have the structure illustrated. The device as a whole or in parts can be broken down or integrated either functionally or physically in accordance with the load or use of the device.

According to the present invention, a regenerative power can be used so that a power consumption is reduced, and at the same time a stable amount of power can be supplied even when the power consumption is large.

Furthermore, according to the present invention, a motor can accelerate a mechanism at a fixed rate, and a structure in which the regenerative power is accumulated efficiently can be realized at low cost.

Moreover, according to the present invention, when a movement pattern of the mechanism is predictable, the ratio of the power supply from the power source to the power supply from a capacitor can be adjusted to an optimal ratio for the movement pattern of the mechanism.

Furthermore, according to the present invention, the cost of the library apparatus does not increase as the case of using the lead accumulator, the power can be repeatedly accumulated and discharged without deteriorating accumulation efficiency, and the library apparatus is environment-friendly and is light in weight because lead or sulfuric acid is not used as electrolyte.

Although the present invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for supplying a power to a motor for driving a mechanism that conveys a cartridge of a storage medium, the apparatus comprising:

an accumulating unit that accumulates a regenerative power generated by the motor in a capacitor; and an adjusting unit that adjusts, when the power is supplied to the motor, a ratio of power supply from a power source to power supply from the capacitor.

2. The apparatus according to claim 1, wherein the accumulating unit uses a voltage step-up/step-down direct current-direct current converter of a current-output-type to accumulate the regenerative power, and the adjusting unit uses the voltage step-up/step-down direct current-direct current converter of a current-output-type to adjust the ratio.

3. The apparatus according to claim 1, wherein the adjusting unit adjusts the ratio based on an anticipated movement-pattern of the mechanism.

4. The apparatus according to claim 1, wherein the capacitor is an electric double-layer capacitor.

5. A method of supplying a power to a motor for driving a mechanism that conveys a cartridge of a storage medium, the method comprising:

accumulating a regenerative power generated by the motor in a capacitor; and adjusting, when the power is supplied to the motor, a ratio of power supply from a power source to power supply from the capacitor.

6. The method according to claim 5, wherein the accumulating includes accumulating the regenerative power by using a voltage step-up/step-down direct current-direct current converter of a current-output-type, and the adjusting includes adjusting the ratio by using the voltage step-up/step-down direct current-direct current converter of a current-output-type.

7. The method according to claim 5, wherein the adjusting includes adjusting the ratio based on an anticipated movement-pattern of the mechanism.

8. The method according to claim 5, wherein the capacitor is an electric double-layer capacitor.

* * * * *